March 1, 1949.  C. W. MORRIS  2,463,488
CABIN ALTITUDE CONTROL
Filed April 1, 1944  2 Sheets-Sheet 1
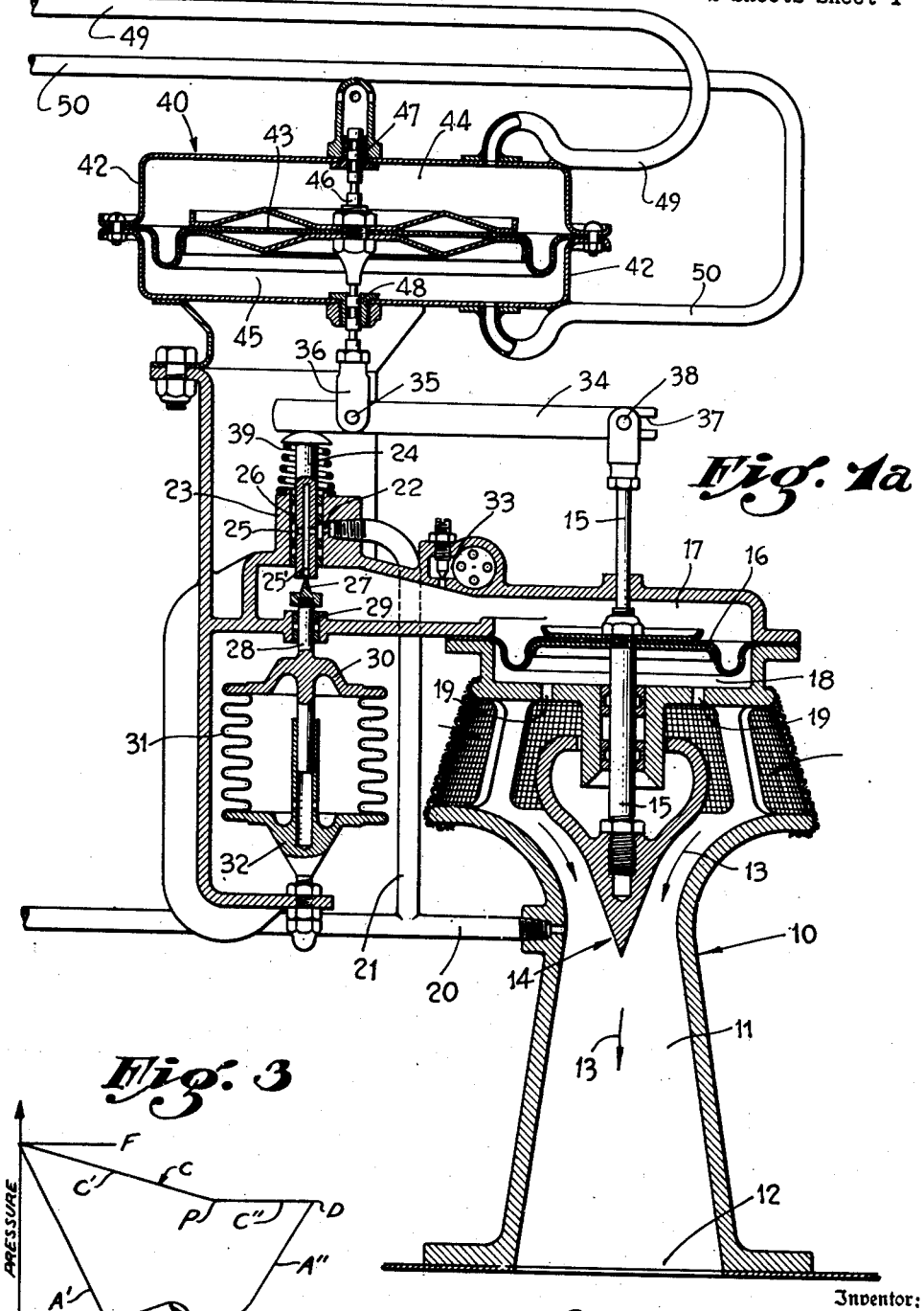
Inventor:
CHARLES W. MORRIS,
By
Attorney.

March 1, 1949. C. W. MORRIS 2,463,488
CABIN ALTITUDE CONTROL
Filed April 1, 1944 2 Sheets-Sheet 2

Inventor:
CHARLES W. MORRIS.
Attorney.

Patented Mar. 1, 1949

2,463,488

UNITED STATES PATENT OFFICE 2,463,488

CABIN ALTITUDE CONTROL

Charles W. Morris, Los Angeles, Calif., assignor to The Garrett Corporation, Airesearch Manufacturing Company division, Los Angeles, Calif., a corporation of California Application April 1, 1944, Serial No. 529,112

15 Claims. (Cl. 98—1.5)

1

My invention relates to aircraft cabin pressure control means and relates in particular to a control for pressurized cabins which will permit the selection of a desired pressure within the cabin and also a desired rate of pressure change within the cabin whereby changes in pressure to which occupants of the cabin are subjected will not be so abrupt or rapid as to cause discomfort of the cabin occupants, or relates to a control to minimize the discomfort which a change in altitude might cause any occupant of the pressurized cabin.

It is an object of the invention to provide a control for an aircraft cabin which may be used in cooperation with means for feeding air under pressure into the cabin, this control having separate control elements, one of which may be pre-set or adjusted while the aircraft is at one altitude, so that the pressure in the aircraft cabin will be brought to a pressure corresponding to another altitude, and a control for producing the required change in cabin pressure gradually over a selected period of time. Let it be supposed that an aircraft upon leaving an air port at one altitude is to land at a field of different altitude within a given period of time. The occupants of the cabin are subjected to a pressure change, produced gradually, so that when the second landing field is reached, the pressure to which the occupants are subjected within the aircraft cabin will correspond to the atmospheric pressure at the second landing field. During the flight from the first field to the second field, the aircraft may rise to an altitude considerably above the altitude of either landing field, but the occupants of the pressurized cabin will not be conscious of this, but will be subjected to a reduced pressure no greater than that corresponding to the altitude of the highest of the two landing fields.

It is an object of the invention to provide a control of the character hereinbefore described having valve means connected to the interior of the aircraft cabin and means sensitive to the pressure within the cabin for controlling the operation of the valve means, with supplementary means for controlling the action of the pressure sensitive means whereby a control of cabin pressure such as described in the foregoing may be achieved without the use of complex mechanisms.

Further objects and advantages of the invention will be brought out in the following part of the specification.

2

Referring to the drawing which is for illustrative purposes only,

Fig. 1a is a view showing that part of my control apparatus which is directly connected to the air valve.

Fig. 3 is a chart showing the relationship between ambient pressure and cabin pressure during a characteristic flight from a low altitude starting point to a high altitude destination.

Figure 2:
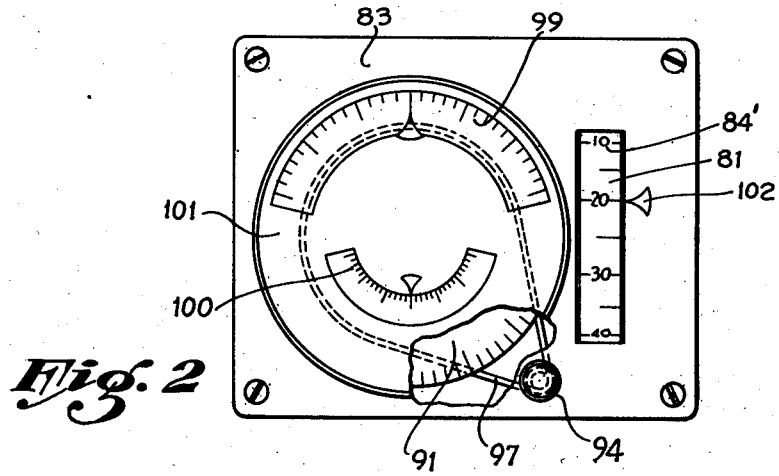
Fig. 2 is a face view of the visible panel of the control unit shown in Fig. 1b.

In Fig. 1a I show an outlet member 10 having a passage 11, the outlet 12 of which communicates with the exterior of an aircraft cabin through an opening in the cabin wall. Air from the interior of the cabin flows as indicated by arrows 13 through the passage 11 to the exterior of the aircraft, and the rate of such flow is controlled by a valve part 14 which is connected to the lower end of a vertical valve stem 15 which is connected to the central portion of a diaphragm 16 which forms a movable wall of an air chamber 17. The lower face of the diaphragm 16 is exposed to the pressure of air in a chamber 18 which communicates with the inlet portion of the passage 11 and the interior of the aircraft cabin through openings 19.

A tube 20 connects with a Venturi throat formed in the passage 11 due to the shape of the member 10, for producing a suction in the tube 21 which connects the tube 20 with a valve bore 22 forming a part of valve means for regulating the flow of air from the chamber 17. This valve means 23 comprises a valve stem 24 having in its lower portion an axial opening 25' which communicates through radial ports 25 with the valve bore 22, there being sealing rings 26 around the stem 24 in the upper and lower portions of the valve bore 22. To control the flow of air into the lower end of the passage 25 of the stem 24 I provide a valve pin 27 connected to the upper end of a stem 28 which projects through an opening 29 in the lower wall of the chamber 17 from the upper end 30 of an aneroid shown as an evacuated bellows 31 having a normally stationary, but vertically adjustable, lower end plate 32. The chamber 17 is provided with an air leakage valve 33 through which a small flow of air may bleed continuously into the chamber 17. Accordingly, the pressure in the chamber 17 at any time is determined by the relative rate of inflow of air through the valve 33 and outflow of air through the axial passage 25 under control of the valve needle 27.

The operation of the valve device 23 is correlated with the movement of the valve member 14 by a fulcrum lever 34 which swings on a horizontal pin 35 supported in the lower end of a clevis 36. The rightward end of the lever 34 is slotted as shown at 37 so as to engage a pin 38 carried by the upper end of the valve stem 15. The leftward end of the lever 34 is arranged to engage the upper end of the valve stem 24. Assuming, for the purpose of explanation, that the pin 35 is stationary, it will be perceived that for each different position of the valve needle 27, there will be a different position of the valve 14. When the valve members 27 and 14 are in static condition, there will be a slight leakage of air through the passage 25 of the stem 24 and thence through the tube 21 and the tube 20 to the outlet passage 11, this outward leakage of air varying such relationship to the leakage of air into the chamber 17 through the leakage valve 33 as to produce a pressure differential between the chamber 17 and the space 18 as to hold the diaphragm 16 and its associated valve member 14 in the raised position in which they are shown. Should there be a reduction in pressure in the aircraft cabin, in which the bellows 31 is situated, there will be an expansion of the bellows 31 so as to lift the valve needle 27 so as to close off the flow of air outward through the passage 25. Then, at this time, the flow of air through the leakage valve 33 into the chamber 17 will result in an increase in pressure against the upper face of the diaphragm 16 so that the downward forces acting on the valve 14, including the downward suction effect of the flow of air indicated by the arrows 13, to move the valve member 14 downward, thereby lowering the rightward end of the lever 34 and raising the leftward end thereof so as to permit a small upward movement of the valve stem 24 by a compression spring 39 provided for this purpose. The outward movement of the stem 24 will establish a new relation between the lower end of the valve stem 24 and the valve needle 27 so as to permit an escape of air from the chamber 17 through the passage 25 to prevent a further rise in pressure in the chamber 17 as the result of an inflow of air thereinto through the leakage valve 33. An increase in the cabin pressure applied to the exterior of the bellows 31 will cause a collapse of the bellows 31 and a corresponding lowering of the valve needle 27 so as to increase the outflow of air from the chamber 17 through the passage 25, thereby reducing the pressure in the chamber 17 so that the pressure in the space 18, acting against the lower face of the diaphragm 16, may raise the same, thereby lifting the valve member 14 and lowering the valve stem 24 so as to reestablish a proper leakage relation between the lower end of the passage 25 and the valve needle 27. A lowering of the valve member 14 will reduce the outflow of air through the passage 11 and cause an increase in cabin pressure and a lifting of the valve member 14 will result in an increase in the outflow of air through the passage 11 and a corresponding decrease in the cabin pressure.

Figure 1B:
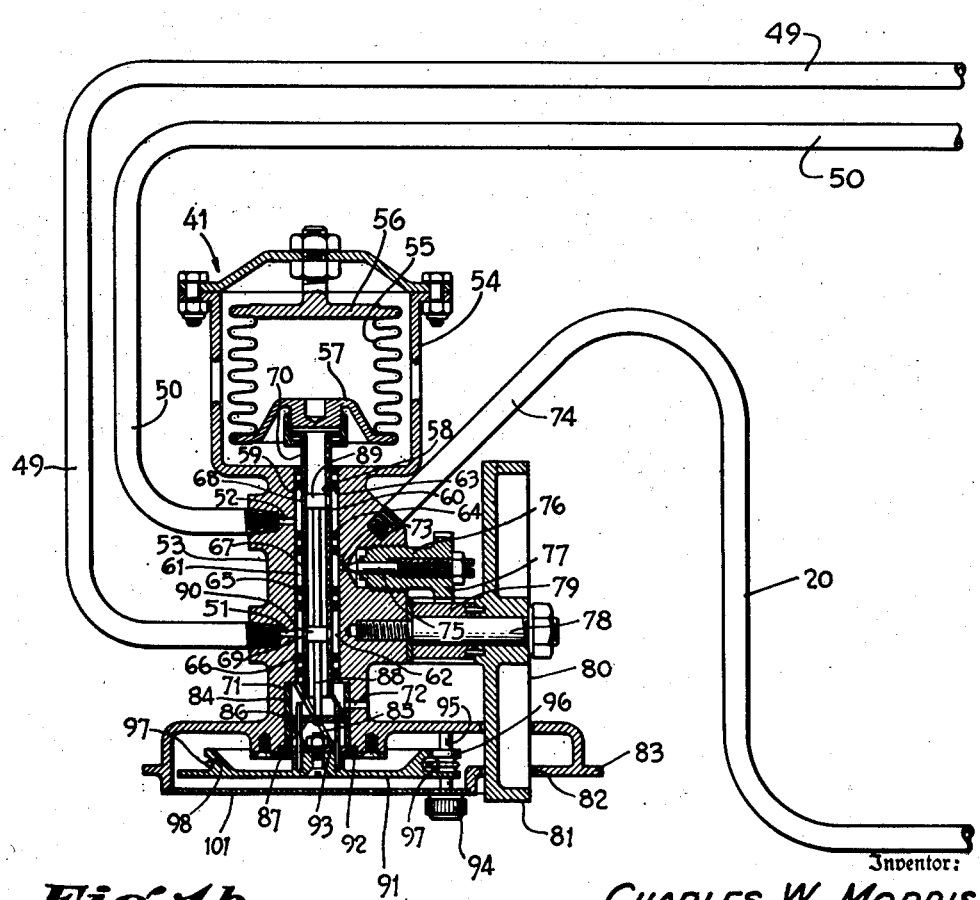
Fig. 1b is a partly sectioned view showing the remainder of the control device comprising the parts capable of being manually pre-set so as to effectuate changes in cabin pressure over a prescribed period of time.

The pressure maintained in the cabin at any time is characteristic of the position of the pin 35 on which the lever 34 swings. For example, if the pin 35 is adjusted upwardly from the position in which it is shown in Fig. 1a, the cabin pressure will be reduced, and if there is a downward adjustment of the pin 35, the cabin pressure will be increased. A feature of the invention resides in means for vertically adjusting the pin 35 so that the pressure sensitive member 31, in cooperation with its associated control parts, will maintain a selected pressure within the aircraft cabin. This means for vertically moving the pin 35 includes a reversible fluid motor 40, shown in the upper part of Fig. 1a, and an adjustable motor control means 41 shown in Figs. 1b and 2. The motor 40 comprises a shell 42 divided by a horizontal diaphragm 43 into upper and lower chambers 44 and 45. A vertical post 46 is supported in the center of the diaphragm 43, the upper end of the post 46 being supported by a guide which is mounted in the upper wall of the shell 42, and the lower portion of the post 46 projecting through a guide 48 in the lower wall of the shell 42 and being connected to the clevis 36. Ducts 49 and 50 are connected respectively to the upper and lower chambers 44 and 45, through which ducts fluid may be moved so as to produce fluid pressure differential acting either downwardly or upwardly as may be required to vertically move the pin 35.

As shown in Fig. 1b, these ducts 49 and 50 extend to ports 51 and 52 in the body 53 of a control valve forming a part of the control unit 41. At the upper end of the body 53 there is an open chamber 54 which contains an evacuated bellows 55 having a normally stationary upper wall 56 which is vertically adjustable. This bellows 55 has a vertically movable lower wall 57 connected to a tubular valve member 58 arranged so that contraction and expansion of the bellows 55 will move the valve member 58 in the bore 59 of the valve body 53, which bore 59 is divided into three chambers 60, 61, and 62 by rings 63, 64, 65 and 66. The tubular valve member 58 has ports 67 near its center communicating with the central chamber 61, ports 68 communicating with the upper chamber 60, ports 69 communicating with the lower chamber 62, and ports 70 near its upper end communicating through the interior of the open chamber 54 with the interior of the cabin. The lower end of the tubular valve member 58 is in open communication with the enlarged space or counterbore 71 at the lower end of the bore 59, which space communicates with the interior of the cabin through a port 72. The body 53 has a valve port 73 communicating with the central chamber 61, and a tube 74, constituting an extension of the tube 20, connects this valve port 73 with the low pressure or suction existing in the throat of the air passage 11, Fig. 1a.

The flow of air through the valve port 73 is controlled by a needle valve 75 carried by a screw 76 having a gear 77 at its outer end. A shaft 78 supported on the body 53 carries a gear 79 which meshes with the gear 77 and is arranged to be rotated by a wheel 80 for preselectively selecting the rate of change desired. The rim 81 of the wheel 80 projects through an opening 82 in a panel 83 which is supported at the lower or front end of the body 53. The rim 81 of the wheel 80 has thereon markings 84' indicating altitude rate-of-change.

In the counterbore 71 there is a sleeve 84 having spiral grooves 85 which are engaged by projections 86 on a disc 87 which is fixed on the lower end of a stem 88 which projects upwardly into the tubular valve member 58, and has thereon short cylindric valve closures 89 and 90 to cooperate respectively with the ports 68 and 69 of the valve tube 58. When the disc 87 is rotated, the stem 88 and its closures 89 and 90 are moved axially within the valve tube 58. Relative axial movement of the tubular valve 58 and the stem 88 will connect the chambers 60 and 62 through the ports 68 and 69 either with the chamber 61 through the port 67 or with the extreme end portions of the tubular valve member 58 which are connected to the cabin interior or cabin air pressure as previously described herein.

Rotation of the disc 87 for preselectively selecting the desired cabin pressure is accomplished by rotation of a circular plate 91 supported as shown at 92 for rotation. Pins 93 project from the hub of the plate 91 through openings in the disc 87, whereby rotation may be transmitted from the plate 91 to the disc to cause the same to move either upwardly or downwardly. Rotation of the plate 91 is accomplished by use of a small knob 94 fixed on the forward end of a shaft 95 which carries also a small sheave 96. A belt 97 extends around the sheave 96 and around a suitable sheave 98 formed on the back of the circular plate 91. The plate 91 has thereon two scales 99 and 100 which are respectively visible through transparent portions of a circular glass plate 101 which is mounted in the panel 83. Both of these scales relate to cabin pressure. The scale 99 indicates pressure in terms of millimeters of mercury, as employed in indicating barometric pressure, and the scale 100 indicates pressure in terms of altitude in feet. In the use of the control means shown in Figs. 1b and 2, the plate 91 may be adjusted to a new position indicating another pressure desired for the cabin interior, and the wheel 80 may be adjusted so as to produce a setting of the valve closure 75 which will act to delay the rate of change of the cabin pressure so that the change in cabin pressure will take place gradually over the period of time designated by the setting of the wheel 80.

The operation of the invention is as follows: Let it be assumed that the aircraft is to fly from a field having an altitude of 1000 feet, indicated at F in Fig. 3, to a destination having an altitude of 5000 feet, indicated at D in Fig. 3. During the flight, the aircraft may have to rise to an altitude of 10,000 or 15,000 feet in order to cross over mountains in its path, and the ambient pressure met with by the plane in such flight may be indicated roughly by the curve A, the portion A′ thereof indicating the initial ascent to a flying altitude, the central portion of the curve indicating the body of the trip at the flying altitude, and the portion A″ indicating the descent to the destination field. The general requirement for the invention is that it provides for a gradual change of cabin pressure toward the ambient pressure existing at the destination D, roughly as indicated by C′ of the cabin pressure curve C, and that the cabin pressure thereafter be maintained roughly at a level corresponding to ambient destination pressure, as indicated by the portion C″ of the cabin pressure curve C.

The invention functions to attain these results in the following manner: The servo motor 40 operates, under the control of the unit 41, to locate the fulcrum pivot 35 at a position which represents the pressure which is to be maintained within the cabin by the valve operating mechanism including the diaphragm 16, the lever 34, the valves 27 and 33, and the bellows 31. For any given position of the pivot 35, the valve operating mechanism will operate the valve 14 in such a manner as to maintain the cabin pressure corresponding to such position of the pivot 35. This valve operating action is brought about by the balancing or unbalancing of inflow through the bleed valve 33 into the chamber 17, against the escape of air through the pilot valve port 25′ under the control of the metering pin or needle valve 27. The inflow through the bleed valve 33 is relatively fixed. The outflow through the port 25′ is differentially controlled by the position of the needle valve 27 (depending upon cabin pressure) and the position of the pilot valve seat 24 (related to the position of the pivot 35).

For each different position of the pivot 35, the valve 14 will move through a narrow range of positions sufficient to compensate for unbalancing factors (such as fluctuations in rate of delivery of air to the cabin). Any tendency of cabin pressure to drop below the value determined by the position of the pivot 35 will result in an expansion of the bellows 31, followed by restriction of outflow through the port 25′, a consequent increase in pressure in the chamber 17, and a resultant closing movement of the valve 14. Conversely, any tendency of cabin pressure to increase above the value determined by the position of the pivot 35 will result in contraction of the bellows 31, consequent increase in the outflow through the port 25′, attendant reduction in pressure in the chamber 17, and resultant opening movement of the valve 14. In all such operations, the follow up action of the plunger 24 under control of the lever 34 will moderate the adjustment of the valve 14 in anticipation of a stabilized position, and thereby avoid hunting.

Assuming that the plane is grounded before the take off, the valve 14 will stand in a relatively closed position. The commencement of operation of the aircraft, with consequent flow of air through the throat 10, will cause a reduction of pressure in the chamber 17 following the outflow of air therefrom through the tubes 21 and 20 to the throat 10. This will cause the diaphragm 16 to move upwardly, opening the valve 14, until the throttling action in the port 25′ resulting therefrom, establishes a balance between the outflow and the inflow through the bleed valve 33. The extent of opening of the valve 14 thus produced will depend upon the position of the pivot 35. At the outset, the position of the pivot 35 will be established to correspond to a neutral position of the diaphragm 43 (such as the position shown in Fig. 1a) which neutral position in turn will depend upon a balancing of equal pressures on both sides of the diaphragm 43.

The function of the control device 41 is to bring about a gradual unbalancing of the pressures in the servo motor 40 which, in the case of flight from a low altitude to a high altitude which is under consideration, will function to gradually raise the pivot 35 from a position determinative of cabin pressure corresponding to ambient pressure at the point of departure, to a position determinative of cabin pressure corresponding to ambient pressure at the destination. This gradual raising of the pivot 35 will be followed by a gradual raising of the pilot valve member 24 under the constant urge of the spring 39, tending constantly to enlarge the opening between the seat member 24 and the needle valve 27, with an attendant reduction in pressure in the chamber 17 and opening movement of the valve 14 such as to permit a gradual drop in cabin pressure. This gradual drop in cabin pressure will cause a corresponding gradual expansion of the bellows 31 which will advance the needle valve 27 in step with the retracting movement of the valve seat element 24 so as to maintain the balance between inflow through the valve 33 and outflow through the orifice 25' which will operate the valve 14 within the proper range of positions for maintaining the necessary outflow-inflow relation for each succeeding cabin pressure level. Stated somewhat differently, the position of the valve seat member 24 is at all times directly related to the position of the pivot 35, and the position of the needle valve 27 will in turn follow the position of the valve seat element 24 under the expanding movement of the bellows 31 caused by the reduction in cabin pressure which in turn is brought about by the gradual receding movement of the valve seat member 24 tending to open the orifice 25' and reduce the pressure in the chamber 17 so as to cause opening movement of the main valve 14. Since cabin pressure is directly related to the expansion of the bellows 31 and thereby to the position of the needle valve 27, which in turn is directly related to the position of the valve seat 24 and thus to the position of the pivot 35, as explained above, it will be apparent that cabin pressure will be thus related to the position of the pivot 35. Consequently, when the pivot 35, after a predetermined lapse of time, finally stops at a stabilized position representing the destination ambient pressure, cabin pressure will likewise arrive at the destination level, and the gradual descent of cabin pressure will be arrested at that level, and will remain at that level as indicated by the portion C" of the cabin pressure curve until the plane reaches the destination, irrespective of the extent of the differential between ambient and cabin pressure resulting from the flight of the plane at a level much higher than the destination level.

The control device 41 provides for the above described gradual upward movement of the pivot 35 in the following manner. The position of the valve sleeve 58 is controlled by the bellows 55 in accordance with cabin pressure. Assuming that at the 1000-foot level at which the plane is to take off, the sleeve 58 has the position shown in Fig. 1b, the setting disc 91 will be rotated clockwise to draw the valve element 88 toward the dial 101, thus causing the valve elements 89 and 90 to uncover the ports 68 and 69 so as to place the underside of the diaphragm 43 of the servomotor 40 in relatively unrestricted communication with cabin atmosphere through the open housing 54, and to place the upper side of the diaphragm 43 in restricted communication with the low pressure zone within the throat 10, through the conduit 49, bleed orifice 73, and conduit 20. The upper chamber of the servo motor 40 is thus subjected to suction which will gradually draw the diaphragm 43 upwardly at a rate determined by the setting of the metering pin 75 controlling the orifice 73. This setting is effected by rotating the wheel 80 to a position indicative of the period of time it is desired to employ for accomplishing the change in the position of the pivot 35. As the cabin pressure gradually drops in response to gradual upward movement of the pivot 35, there will be a corresponding gradual movement of the valve sleeve 58 toward the dial 101, gradually bringing the ports 68 and 69 back into registry with the valve elements 89 and 90 until, when the cabin pressure corresponds to the ambient pressure at destination, the ports 68 and 69 will be substantially closed (remaining cracked just sufficiently to maintain that amount of suction against the upper chamber of the servo motor which will be required to maintain the diaphragm 43 balanced in the position to which it has been adjusted, and compensate for leakage of air into this chamber through the bearing 47).

Any tendency of cabin pressure to drop materially below the destination pressure determined by the servomotor 40 will be overcome by the tendency of the diaphragm 43 to move downwardly. If there should occur a reduction in cabin pressure of sufficient magnitude and suddenness, the corresponding movement of the valve sleeve 58 would reverse the connections to the servomotor 40, placing the suction on the lower side of the diaphragm 43 and rapidly adjusting the pivot 35 for an increase in cabin pressure.

In the return trip from the high altitude to the low altitude, the valve element 88 will be reset by counterclockwise movement of the setting wheel 91, to a position farther away from the dial 101, in which the ports 68 and 69 will be uncovered so as to place the upper side of the diaphragm 43 in relatively unrestricted communication with cabin atmosphere through the conduit 49, the lower sides of the port 68 and the port 72, and to place the lower chamber of the servomotor 40 in restricted communication with the low pressure area of the throat 10 through the conduit 50, the bleed orifice 73, and the conduit 20, thus causing the pivot 35 to gradually lower at a rate dependent upon the setting of the metering pin 75, until it reaches a position corresponding to the destination pressure. The cabin pressure will gradually drop in response to this gradual lowering of the pivot 35 in a manner similar to the gradual rise in cabin pressure described above. The pivot 35 of applicant's mechanism may be termed a control part, and the regulator mechanism may be considered as comprising the valve 14 and diaphragm 16, together with the control means therefor which comprises the pilot valves 25' 27, differential control mechanism (24 and 31), and the bleed valve 33, as well as the follow-up lever 34. The regulator is adapted, for any set position of the pivot 35, to fully control cabin pressure at all times at a predetermined level determined by the position of said pivot 35. There may be slight fluctuations in cabin pressure while the pivot 35 remains stationary. Such fluctuations may be caused by variations in input from the supercharger or variations in the differential between cabin pressure and ambient pressure. But such fluctuations will be met by adjustment of the valve 14 through the response of the diaphragm 16 to variations in the pressure in the chamber 17, while the pivot 35 remains stationary, and this response to the regulator will in all cases operate to bring the cabin pressure level back to the exact level determined by the position of the pivot 35. The position of the pivot 35 is in turn determined by the preselective control mechanism for gradually shifting such position at a predetermined rate.

I claim as my invention:

1. In a control device for the internal air pressure of an aircraft cabin, the combination of: a wall forming an air passage; a closure for cooperation with said passage; a chamber having a movable wall, the outer face of which is exposed to air pressure exterior of said chamber; means for connecting said movable wall to said closure whereby movement of said wall will result in movement of said closure; a valve for connecting the interior of said chamber with a source of low pressure, said valve comprising a pair of movable parts defining a port and a closure, relative movement of said parts in one direction opening said valve port and relative movement of said parts in another direction closing said port; means responsive to changes in the pressure in said cabin for moving one of said valve parts; means connecting said closure to the other of said valve parts whereby movement of said closure will move said other valve part; independent means for moving one of said valve parts so that the position of cooperation of said valve parts may be varied; power means for actuating said independent means; and adjustable means for controlling the speed of operation of said power means.

2. In a control device for the internal air pressure of an aircraft cabin, the combination of: a wall forming an air passage; a closure for cooperation with said passage; a chamber having a movable wall, the outer face of which is exposed to air pressure exterior of said chamber; means for connecting said movable wall to said closure whereby movement of said wall will result in movement of said closure; a valve for connecting the interior of said chamber with a source of low pressure, said valve comprising a pair of movable parts defining a port and a closure, relative movement of said parts in one direction opening said valve port and relative movement of said parts in another direction closing said port; means responsive to changes in the pressure in said cabin for moving one of said valve parts; a fulcrum lever connecting said closure to the other of said valve parts whereby movement of said closure will move said other valve part; reversible motor means for moving the fulcrum point of said lever so as to vary the position of cooperation of said valve parts; and means for controlling the direction and speed of operation of said motor means.

3. In an aircraft cabin pressure control mechanism comprising: flow control means for directly controlling the cabin pressure; means, including a valve and a pressure responsive device for controlling the flow control means; a suction operated servomotor having an operative connection with the first and second mentioned means and adapted to adjust same for controlling the cabin pressure at various pressure levels corresponding to positions of adjustment of said motor; a valve for controlling the application of suction to said servo motor, said valve including a part adapted to be preset to a position determinative of the cabin pressure level at which the operative movement of the motor is to be arrested; a shiftable valve part; and means responsive to changes in cabin pressure, connected to said shiftable valve part, adapted, when cabin pressure has arrived at the level predetermined by the setting of the first mentioned valve part, to shift the shiftable valve part for cooperation with the first mentioned valve part in arresting the application of suction to the servomotor.

4. In an aircraft cabin pressure control mechanism comprising: a regulator for directly controlling the cabin pressure; an adjustable control part connected to said regulator for controlling same, to control the cabin pressure at various pressure levels corresponding to positions of adjustment of said control part; an air pressure operated servomotor connected to said control part for shifting same from one to another of its positions of adjustment, said servomotor comprising means defining a pair of opposed fluid chambers and a movable pressure responsive element separating said chambers and connected to said control part; ducts connected to the respective chambers; valve means, connected to said ducts, and controlling same, for controlling the extent of movement of said pressure responsive element, said valve means including a valve member and means to preset the same at a position determining the position to which said pressure responsive element may move, a second valve member; a bellows connected to the second valve member and responsive to changes in cabin pressure for gradually shifting said second valve member from a position permitting the application of an air pressure differential, by way of said ducts, to said fluid motor, to a position arresting said application of said air pressure differential, and thereby arresting the shifting movement of said control part; and means for controlling the rate of application of said air pressure differential to said servomotor, said last mentioned means comprising a bleed valve for controlling the air flow which provides said air pressure differential, and means for presetting said bleed valve to various positions of adjustment which predetermine various time periods for the operation of said servomotor.

5. In an aircraft cabin pressure control mechanism comprising: a flow valve for directly controlling the outflow of air from the cabin so as to control the pressure therein; air pressure responsive means connected to said valve and adapted to operably move same; means for controlling the application of air pressure to said pressure responsive means comprising a pilot valve including a valve member, means, connected to said valve member and responsive to cabin pressure for shifting said valve member, a shiftable cooperating valve member, and adjustable control means connected to the cooperating valve member for adjustably shifting said valve member; a reversible fluid motor connected to said control means for shifting same from one to another of its positions of adjustment; preselective means, including means responsive to cabin pressure for controlling the pressure transmitted to the fluid motor, for determining the extent of shifting movement produced by said fluid motor; and preselective means regulating the pressure transmitted to the first mentioned preselective means for determining the period of time required for completing said shifting movement.

6. In an aircraft cabin pressure control mechanism comprising: a flow valve for directly controlling the outflow of air from the cabin so as to control the pressure therein; air pressure responsive means for moving said flow valve; means for controlling the application of air pressure to said pressure responsive means comprising a pilot valve including a shiftable valve member, means responsive to cabin pressure for shifting said valve member, a cooperating shiftable valve member; a suction operated servomotor connected to said cooperating valve member for controlling the shifting of said member; means, including a valve, for controlling the application of suction to said servomotor, said valve including a part adapted to be preset at a position for determining the cabin pressure level at which the shifting movement is to be arrested; a second shiftable valve part; and means, connected to said second valve part, responsive to changes in cabin pressure and adapted, when cabin pressure has arrived at the level predetermined by the setting of the first mentioned valve part, to cooperate with the latter in arresting the application of suction to the servomotor.

7. In an aircraft cabin pressure control mechanism comprising: a flow valve for directly controlling the outflow of air from the cabin so as to control the pressure therein; air pressure responsive means for moving said flow valve; means for controlling the application of air pressure to said pressure responsive means comprising a pilot valve including a shiftable valve member; means, connected to said valve member and responsive to cabin pressure for shifting said valve member, a cooperating valve member; variable speed reversible motor means so constructed and arranged as to control the shifting of said cooperative valve member; preselective means for determining the position at which the movement of the motor means will be arrested and for arresting said motor means at that position; and adjustable means for controlling the operation of said motor means at various rates providing various predetermined time periods for the completion of the shifting movement of said motor.

8. In an aircraft cabin pressure control mechanism comprising: a flow valve for directly controlling the outflow of air from the cabin so as to control the pressure therein; air pressure responsive means for moving said flow valve; means for controlling the application of air pressure to said pressure responsive means, comprising a pilot valve including a shiftable valve member; means, connected to said valve member, responsive to cabin pressure for shifting said valve member, a cooperating shiftable valve member; an air pressure operated servomotor connected to said cooperating shiftable valve member for moving same from one position of adjustment to another, said servomotor comprising means defining a pair of opposed fluid chambers and a movable pressure responsive element separating said chambers and connected to said cooperating valve member; ducts connected to the respective chambers; a valve connected to said ducts, for controlling the extent of movement of said pressure responsive element, said valve, including a movable valve part and means to preset the same at a position determining the position to which said pressure responsive element will move, a second valve part, said valve part being shiftable; and means connected to said second valve part and responsive to changes in cabin pressure for gradually shifting said second valve part from a position permitting the application of an air pressure differential to said fluid motor to a position arresting said application of air pressure differential; and means for controlling the rate of application of said air pressure differential to said servomotor, said last means comprising a bleed valve for controlling the air flow which provides said air pressure differential, and means for presetting said bleed valve at various positions of adjustment predetermining various time periods for the operation of said servomotor.

9. In an aircraft cabin pressure control mechanism comprising: flow control mechanism including control means shiftable to a plurality of positions each of which is determinative of a corresponding cabin pressure; a suction operated servomotor connected to said control means for shifting same from one to another of its positions of adjustment; means, including a pair of suction transmitting ducts connected with the servomotor; a valve, connected with said ducts, for controlling the application of suction to said servomotor, said valve including a part adapted to be preset to a position determinative of the cabin pressure level at which the shifting movement is to be arrested; a second shiftable valve part; means, connected to the second valve part, responsive to changes in cabin pressure for actuating said second valve part, said means and second valve part being adapted, when cabin pressure has arrived at the level predetermined by the setting of the first mentioned valve part, to cooperate with the latter in cutting off of the application of suction to the servomotor.

10. In an aircraft cabin pressure control mechanism comprising: flow control mechanism including shiftable control means; an air pressure operated servomotor connected to said control means, said servomotor comprising a movable wall and air chambers on opposite sides thereof; a duct for each of said chambers and adapted to transmit air pressure thereto; a valve connected to said ducts for controlling air pressure differential acting upon said movable wall, said valve including a movable valve part; means for presetting said movable valve part for determining at least in part the cabin pressure level at which the shifting movement of said control means is to be arrested; a second movable valve part; and means, connected to the second valve part, responsive to changes in cabin pressure for moving the second valve part to a position determined by absolute cabin pressure, said position being so related to the position of the first mentioned valve part that the two valve parts will cooperate in arresting the change in differential air pressure acting on the movable wall of said servomotor.

11. In air aircraft cabin pressure control mechanism comprising: flow control means including shiftable control means; a suction operated servomotor, said motor comprising means defining a pair of opposed fluid chambers and a movable pressure responsive element separating said chambers and connected to said control means; a pair of conduits respectively connected to said chambers; a valve, having connections with said conduits and controlling the extent of movement of the pressure responsive element, said valve including an adjustable valve part and means to preset the same in a position determining the position to which said pressure responsive element may move, a second movable valve part, and means, connected to the second valve part, responsive to changes in cabin pressure and adapted, in response to said changes, to gradually move the second valve part from a position permitting the application of suction to said servomotor, to a position arresting said application of suction for thereby arresting the shifting movement of said control means; and means for controlling the rate of application of suction to said servomotor, said means comprising a bleed valve connected with a source of suction, and means for presetting said bleed valve to various positions of adjustment predetermining various time periods for the operation of said servomotor.

12. In an aircraft cabin pressure control mechanism comprising: flow control mechanism including a venturi, a valve for controlling air flow, a pressure responsive movable wall, and a chamber on each side of said wall, one of the chambers being subjected to cabin pressure; an air bleed for admitting air from said cabin into the chamber; a connection between said venturi and said other chamber; a valve for controlling said connection and comprising a movable valve member, and a second movable valve member; a connection between the first mentioned valve member and the first mentioned valve; absolute pressure responsive means connected with the second movable valve member and subjected only to cabin pressure; means for adjusting the connection between said valve member and valve, including a diaphragm and a chamber on each side of said diaphragm; a duct for each of said chambers; a valve controlling said ducts; a conduit connecting said valve and venturi in parallel with the first mentioned duct, the last mentioned valve comprising a pair of movable ad cooperable members; means for presetting the position of one of said members; and an absolute pressure responsive device, responsive only to cabin pressure, for controlling the other of said valve members.

13. An aircraft cabin pressure control mechanism comprising: flow control means, including a pressure responsive regulator, directly controlling the cabin pressure; means for controlling the application of pressure to said regulator; a fluid motor having a movable wall connected to the first and second mentioned means, said movable wall being movable in response to differential pressures on opposite sides thereof for adjusting said first and second mentioned means for controlling the cabin pressure at various pressure levels corresponding to positions of adjustment of said movable wall; and motor control means, including a first preselective valve means controlling said fluid motor for determining the extent of operative movement of said movable wall, said motor control means also including a second preselective valve means for regulating the rate of application of differential pressures to the opposite sides of the movable wall of said fluid motor for determining the period of time for completing said operative movement.

14. In an aircraft cabin pressure control device: a flow control mechanism for directly controlling the cabin pressure; means connected to the flow control mechanism for controlling the same; a pressure actuated variable speed reversible motor having a pressure actuated movable wall connected to said flow control mechanism and to said means for controlling the cabin pressure at various pressure levels corresponding to various positions of said movable wall; preselective means for applying pressure to said movable wall to move the same and for arresting movment of said movable wall at a preselected position; and adjustable means for controlling the operation of said motor at various rates providing various predetermined time periods for the completion of the movement of said movable wall.

15. In an aircraft cabin pressure control device: a flow control mechanism including a valve; control means connected to said mechanism for controlling the same and including an absolute pressure responsive device subject only to cabin pressure; means independently interconnecting said valve and control means; means for variably adjusting said interconnecting means; and preselective rate of change means for controlling said adjusting means, said preselective means including a bellows responsive only to cabin pressure.

CHARLES W. MORRIS.

REFERENCES CITED

The following references are of record in the file of this patent:

UNITED STATES PATENTS

| Number | Name | Date |
|---|---|---|
| 2,208,554 | Price | July 16, 1940 |
| 2,284,984 | Nixon et al. | June 22, 1942 |
| 2,307,199 | Cooper | Jan. 5, 1943 |
| 2,342,220 | Price | Feb. 22, 1944 |
| 2,396,116 | Noxon | Mar. 5, 1946 |
| 2,413,027 | Maxson | Dec. 24, 1946 |
| 2,419,707 | Cooper et al. | Apr. 29, 1947 |
| 2,424,491 | Morris | July 22, 1947 |
| 2,433,206 | Dube | Dec. 23, 1947 |

FOREIGN PATENTS

| Number | Country | Date |
|---|---|---|
| 521,623 | Great Britain | May 27, 1940 |

OTHER REFERENCES

"Pressurized Cabin Control," by Tinker & Hubbard, in Aviation, Jan. 1941, pgs. 38, 119, 124.